US008876183B2

(12) United States Patent
Tuomisto et al.

(10) Patent No.: US 8,876,183 B2
(45) Date of Patent: Nov. 4, 2014

(54) HIGH RETENTION TRIM ATTACHMENT SYSTEM

(75) Inventors: Paul Tuomisto, Crosse Ile, MI (US); Jason Richard Nagy, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/605,023

(22) Filed: Sep. 6, 2012

(65) Prior Publication Data

US 2014/0062115 A1    Mar. 6, 2014

(51) Int. Cl.
*B60R 13/02*   (2006.01)

(52) U.S. Cl.
USPC .................... 296/1.08; 296/187.05

(58) Field of Classification Search
USPC ............... 52/704, 301; 411/508, 527, 45–48; 24/458, 581.11, 297, 295, 294, 293, 24/292; 296/1.08, 39.1, 146.7
See application file for complete search history.

(56) References Cited

U.S. PATENT DOCUMENTS

| 5,288,530 | A | 2/1994 | Maki |
| 5,639,522 | A | 6/1997 | Maki et al. |
| 7,140,079 | B2 * | 11/2006 | Nishimura et al. ............. 24/289 |
| 7,165,371 | B2 | 1/2007 | Yoyasu |
| 7,213,378 | B2 | 5/2007 | Randez Perez et al. |
| 7,523,982 | B2 * | 4/2009 | Yamaguchi .................... 296/209 |
| 8,070,204 | B2 * | 12/2011 | Mourou ....................... 296/1.08 |
| 2004/0113401 | A1 * | 6/2004 | Ryu ........................... 280/730.2 |
| 2006/0168773 | A1 * | 8/2006 | Smith et al. ..................... 24/295 |
| 2008/0197609 | A1 * | 8/2008 | Jaramillo et al. .......... 280/730.2 |
| 2009/0085329 | A1 * | 4/2009 | Kwak et al. ................. 280/728.2 |
| 2010/0199464 | A1 * | 8/2010 | Sano ............................... 24/289 |
| 2011/0232049 | A1 | 9/2011 | Ribes Marti |

* cited by examiner

*Primary Examiner* — Glenn Dayoan
*Assistant Examiner* — Sunsurraye Westbrook
(74) *Attorney, Agent, or Firm* — Vichit Chea; Price Heneveld LLP

(57) ABSTRACT

A trim panel having at least one bracket portion which is releasably coupled to a bracket member having a clip receiving assembly. A clip is received in the clip receiving assembly and adapted to couple to a car body. The clip is a high retention clip adapted to retain the trim panel on the car body during an air curtain deployment event. The trim panel is further adapted to be removeable from the bracket member to allow access to an underlying air curtain deployment mechanism. The trim panel is adapted to be removed from the bracket member while the bracket member and clip assembly remain coupled to a car body in a vehicle interior.

19 Claims, 9 Drawing Sheets

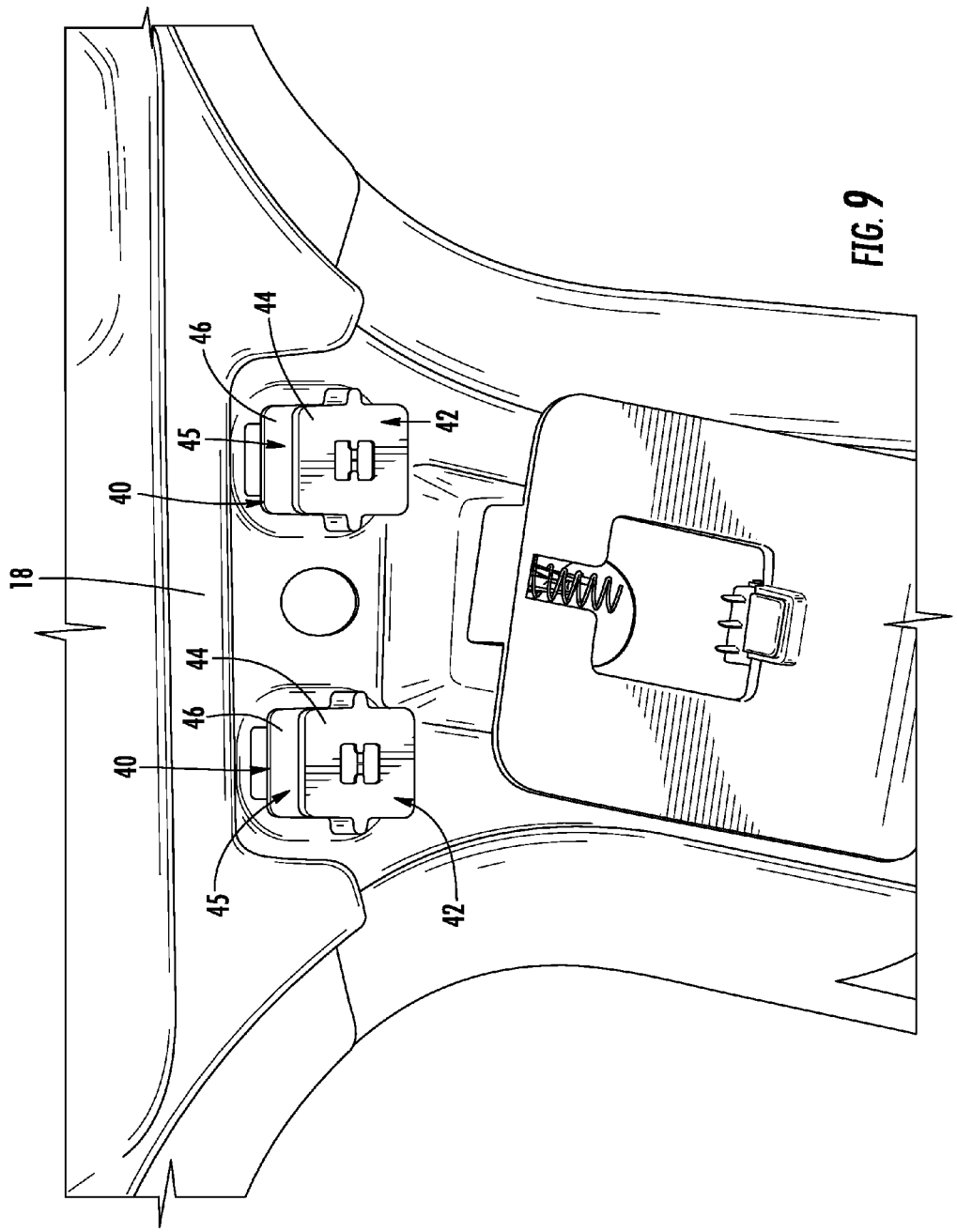

HIGH RETENTION TRIM ATTACHMENT SYSTEM

FIELD OF THE INVENTION

The present invention generally relates to a trim attachment system, and more particularly, to a trim attachment system configured to provide high retention of a trim piece in a vehicle interior during both static and dynamic air curtain deployment through the trim piece.

BACKGROUND OF THE INVENTION

Automotive vehicles are commonly equipped with interior trim panels that are adapted to mount to the vehicle body. Certain trim panels are adapted to cover or conceal an air curtain deployment mechanism, and such trim panels must be rigidly attached to the car body frame to ensure that they are retained in place during air curtain deployment. If a trim panel is not adequately retained in position on a car body, the trim panel can become a dangerous projectile in a vehicle interior given the high rate of speed of deployment for air curtain deployment systems. Ideally, the trim panel remains connected to the car body during a static or dynamic air curtain deployment, such that the air curtain projects through the trim piece to protect the vehicle occupant.

Typically, trim pieces used to cover air curtain deployment mechanisms have required bolts or other like fasteners to attach the trim piece to the car body, thereby providing the rigid retainment necessary to keep the trim piece in place during air curtain deployment. Using a bolt or fastener to rigidly retain a trim piece to the car body requires access to the bolt head which is generally provided on a design side of a trim piece. The access locations are usually covered with plugs to conceal the fastener heads. The visible plugs interfere with the overall aesthetic appearance of the trim piece, and the fasteners used to rigidly retain the trim piece to the car body are not easily removed to provide access to the air curtain deployment mechanism which may require servicing. Thus, a need exists for a trim piece having a trim attachment system that provides attachment of the trim piece to the car body in a high retention manner so as to retain the trim piece on the car body frame during deployment of an air curtain deployment mechanism. Further, there is a need for the trim attachment system to provide easy access to the air deployment mechanism without the use of bolts or plugs to retain the trim piece to the car body.

SUMMARY OF THE INVENTION

According to one aspect of the present invention, a trim attachment system comprises a trim panel adapted to cover an air curtain deployment mechanism. The trim panel further includes at least one slotted bracket. A bracket member having a clip receiving portion is included in the trim attachment system, wherein the bracket member is adapted to releasably couple to the slotted bracket of the trim panel. A clip member is received in the clip receiving portion of the bracket member and is further adapted to couple to a car body. The clip member is a high retention clip adapted to retain the trim panel on the car body during an air curtain deployment event. The trim panel of the trim attachment system is adapted such that it can be removed from the bracket member to provide access to the air curtain deployment mechanism while the clip member remains coupled to the car body.

According to another aspect of the present invention, a trim attachment system comprises a clip member coupled to a car body. A bracket member is coupled to the clip member, wherein the bracket member includes an engagement portion. A trim panel having a slotted bracket portion is adapted to releasably couple to the engagement portion of the bracket member, such that the trim panel can be removed from the bracket member while the clip assembly remains coupled to the car body.

Yet another aspect of the present invention includes a trim attachment system comprising a trim panel having at least one bracket portion, and a bracket member releasably coupled to the bracket portion of the trim panel. The bracket member further includes a clip receiving assembly wherein a clip member is received which is adapted to couple to a car body. The clip is a high retention clip adapted to retain the trim panel on the car body during an air curtain deployment event.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 9 is a fragmentary perspective view of bracket members attached to a car body with a trim piece removed therefrom.

DETAILED DESCRIPTION OF THE PREFERRED EMBODIMENTS

Figure 1:
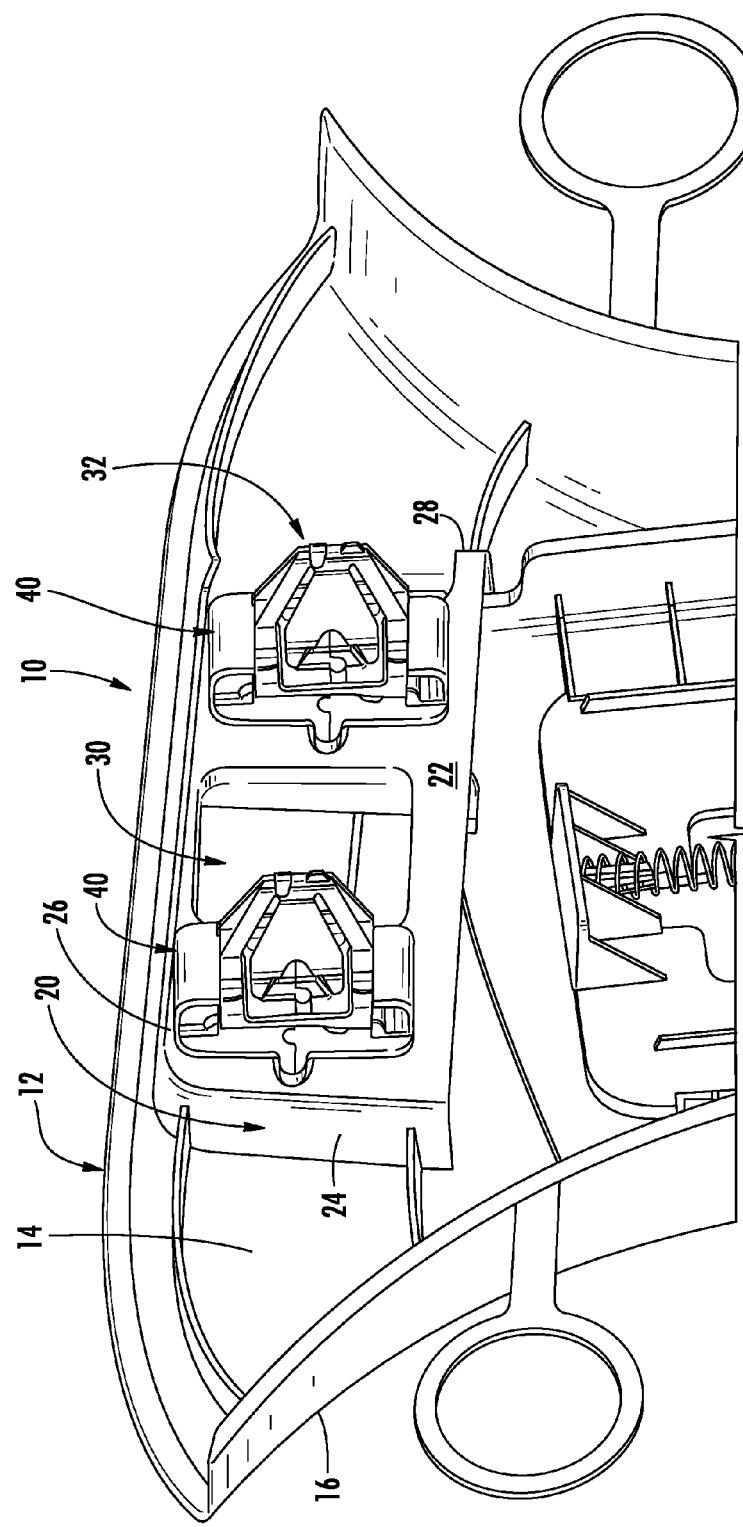
FIG. 1 is a fragmentary perspective view of a trim attachment system, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates the trim panel attachment system according to one aspect of the present invention. The trim attachment system 10 comprises a trim piece or trim panel 12 having a car body side 14 and an aesthetic interior design side 16. The trim panel 12 is adapted to couple to a car body frame 18, which is exemplified in FIG. 7 as a car pillar, such as a B-pillar, which is generally a support pillar disposed between front and rear vehicle doors. As shown in FIG. 1, the trim panel 12 comprises a bracket portion 20 disposed on the car body side 14. The bracket portion 20 includes a raised planar portion 22 which is spaced apart from the body side 14 of the trim panel 12 by shoulders or sidewalls 24, 26 and 28. The bracket member 20 further comprises first and second slotted brackets 30, 32 having slots 34 which are enlarged at a first end 36 and narrowed at a second end 38 thereby defining "key hole" or "dog house" slots 34 adapted to receive clip assemblies 40 as shown in FIGS. 1 and 2.

Figure 2:
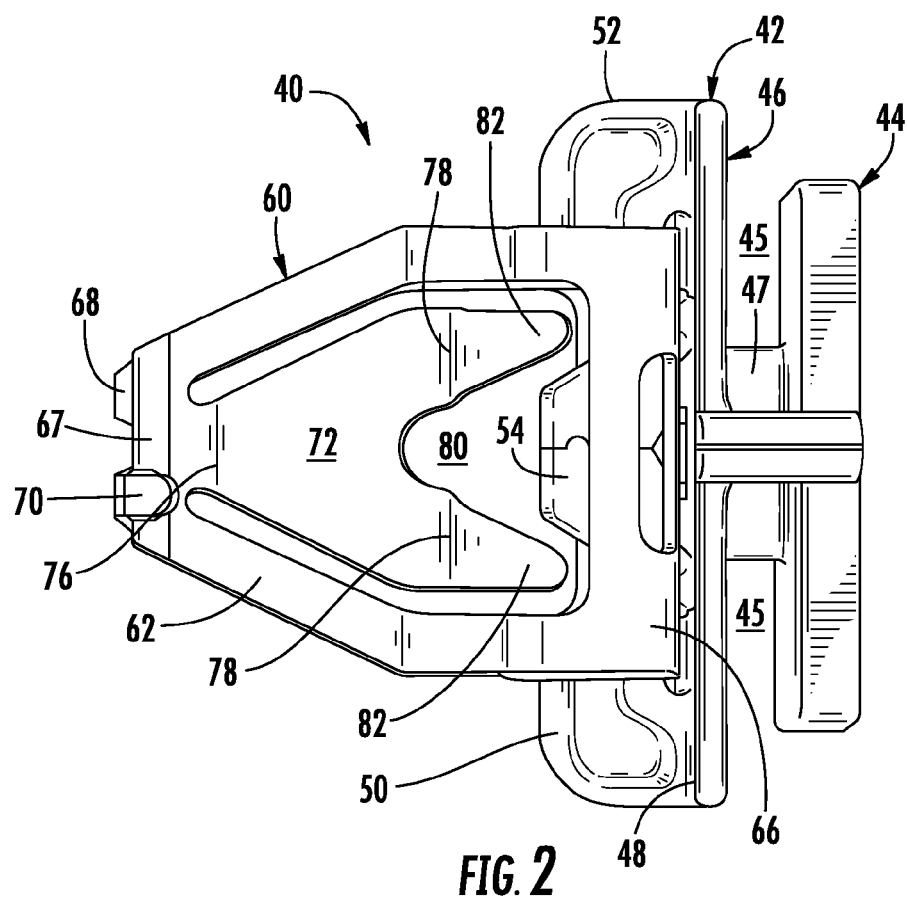
FIG. 2 is a side elevational view of a clip assembly.

As shown in FIG. 2, the clip assemblies 40 include a bracket member 42 having an engagement portion 44 and a clip receiving portion 46 with a web portion 47 disposed therebetween. The bracket members 42 can be pre-assembled to the trim panel 12. As shown in FIG. 2, the bracket member 42 has a generally I-shaped configuration comprised of the engagement portion 44, the web portion 47, and the clip receiving portion 46, thereby defining a channel 45. The clip receiving portion 46 comprises a generally planar body portion 48 having first and second arms 50, 52 and tab 54 which are adapted to engage and retain a clip member 60 as further described below.

Figure 8:
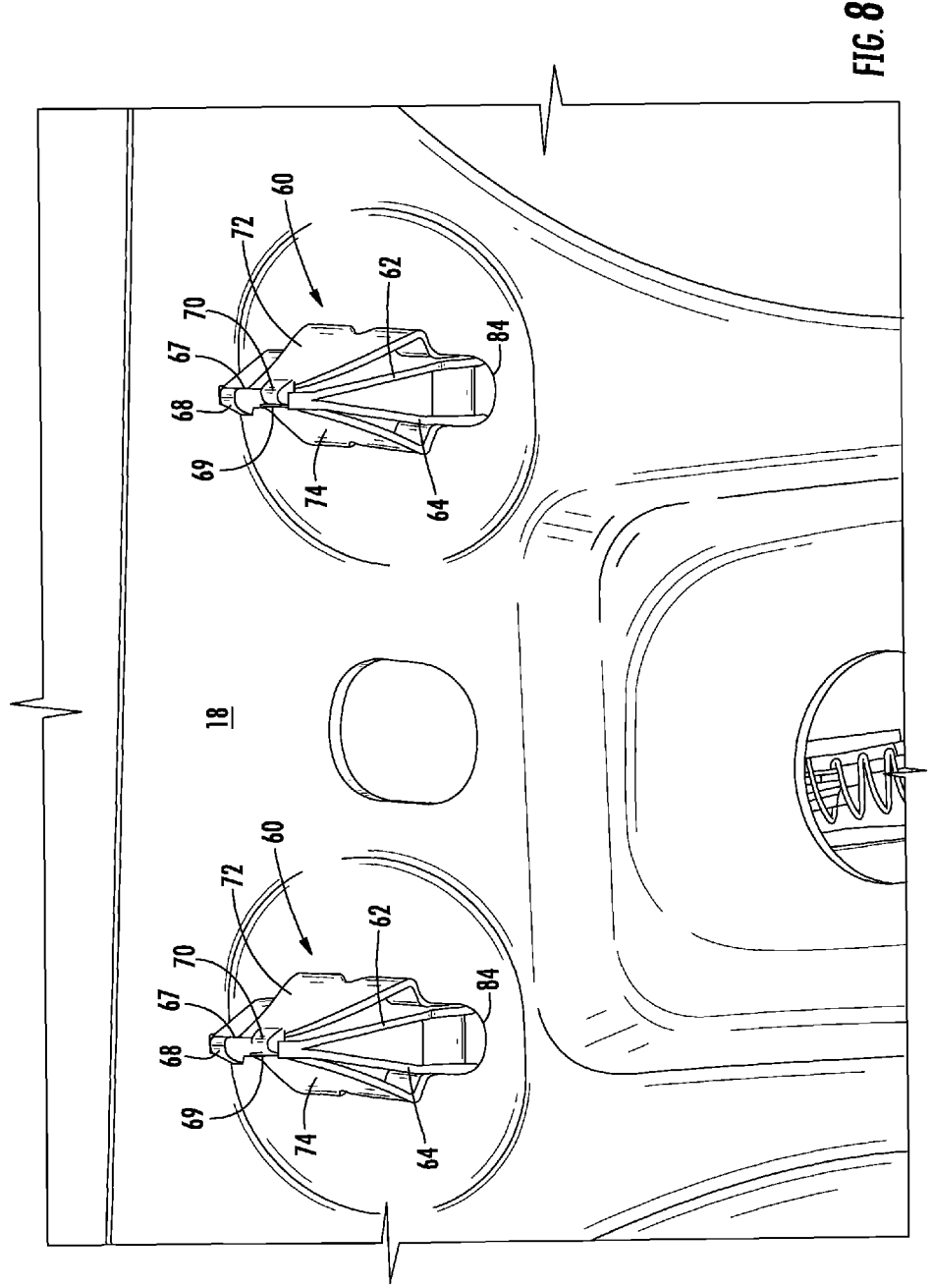
FIG. 8 is a fragmentary perspective view of clip assemblies attached to a car body.

The clip member 60, as shown in FIGS. 2 and 8, includes outer frame members 62, 64 which are coupled at a lower end or base portion 66. It is contemplated that the clip member 60 is comprised of a metal material. The outer frame members 62, 64 further include upper ends 67, 69, which essentially form an apex of the outer frame members 62, 64. The upper portions 67, 69 further include tabs 68, 70 respectively, which couple upper ends 67, 69 to one another. Attached to upper ends 67, 69 are first and second engagement members 72, 74, which include pivot portions 76 and abutment portions 78. The engagement members 72, 74 are generally disposed in an interior space 80 defined by outer frame members 62, 64. The engagement members 72, 74 act as living hinges at pivot portions 76 for engaging apertures disposed in a car body. The abutment portions 78 are adapted to abut the car body apertures, such as apertures 84 shown in FIG. 8, and retainment tabs 82 are adapted to retain the clip members 60 in engagement with the car body 18. Essentially, the clip member 60 is a one-piece clip having outer frame members 62, 64 (FIGS. 5 and 8) having a base portion 66 disposed therebetween. In assembly, the clip member 60 is coupled to the bracket member 42 by sliding one of the outer frame members 62, 64 (including the associated engagement member 72, 74) underneath the arms 50, 52 of the bracket member 42 such that the base portion 66 of the clip member 60 is disposed under the arms 50, 52. The arms 50, 52 connect at tab 54 and thereby rigidly retain the clip member 60 on the bracket member 42 to form an overall clip assembly 40. Once the clip member 60 is in place with the base portion 66 disposed under the arms 50, 52 of the bracket member 42, the upper ends 67, 69 of the clip member 60 are brought together and engaged by tabs 68, 70 to form a generally triangular shaped clip member 60 having engagement members 72, 74 that resiliently extend orthogonally outward from outer frame members 62, 64.

Figure 3:
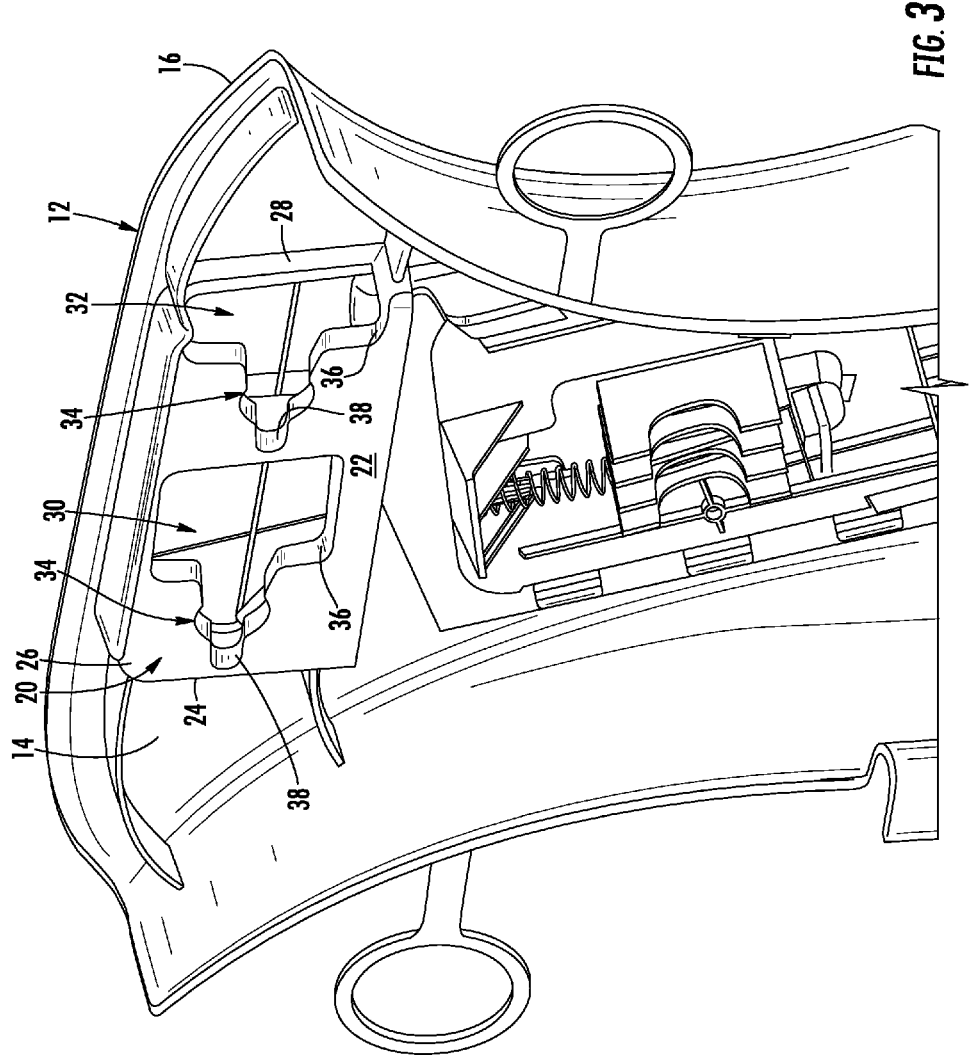
FIG. 3 is a fragmentary perspective view of a trim panel having a bracket portion.
Figure 4:
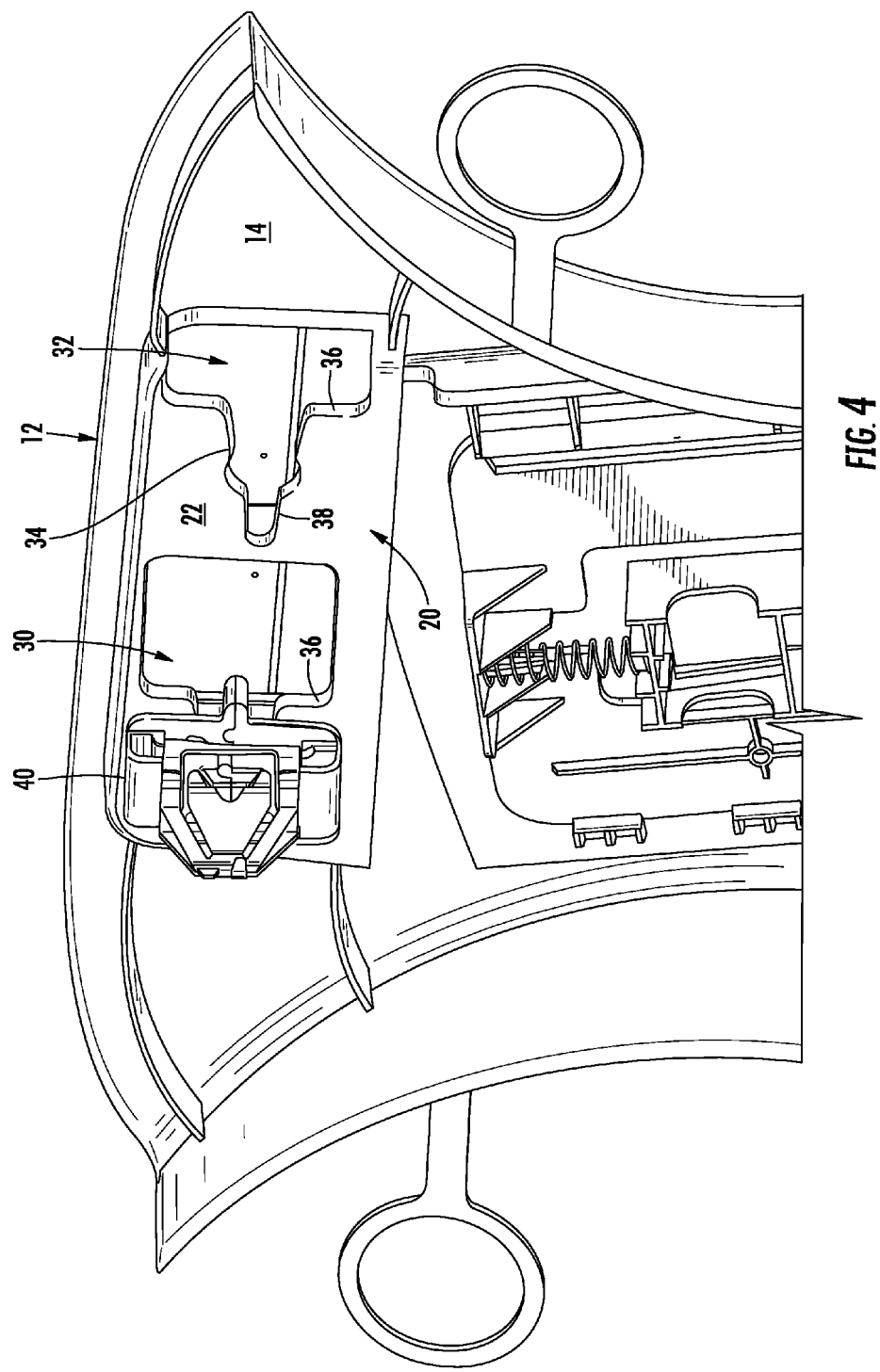
FIG. 4 is a fragmentary perspective view of the trim panel of FIG. 3 shown with a clip assembly coupled to the trim panel at the bracket portion.
Figure 7:
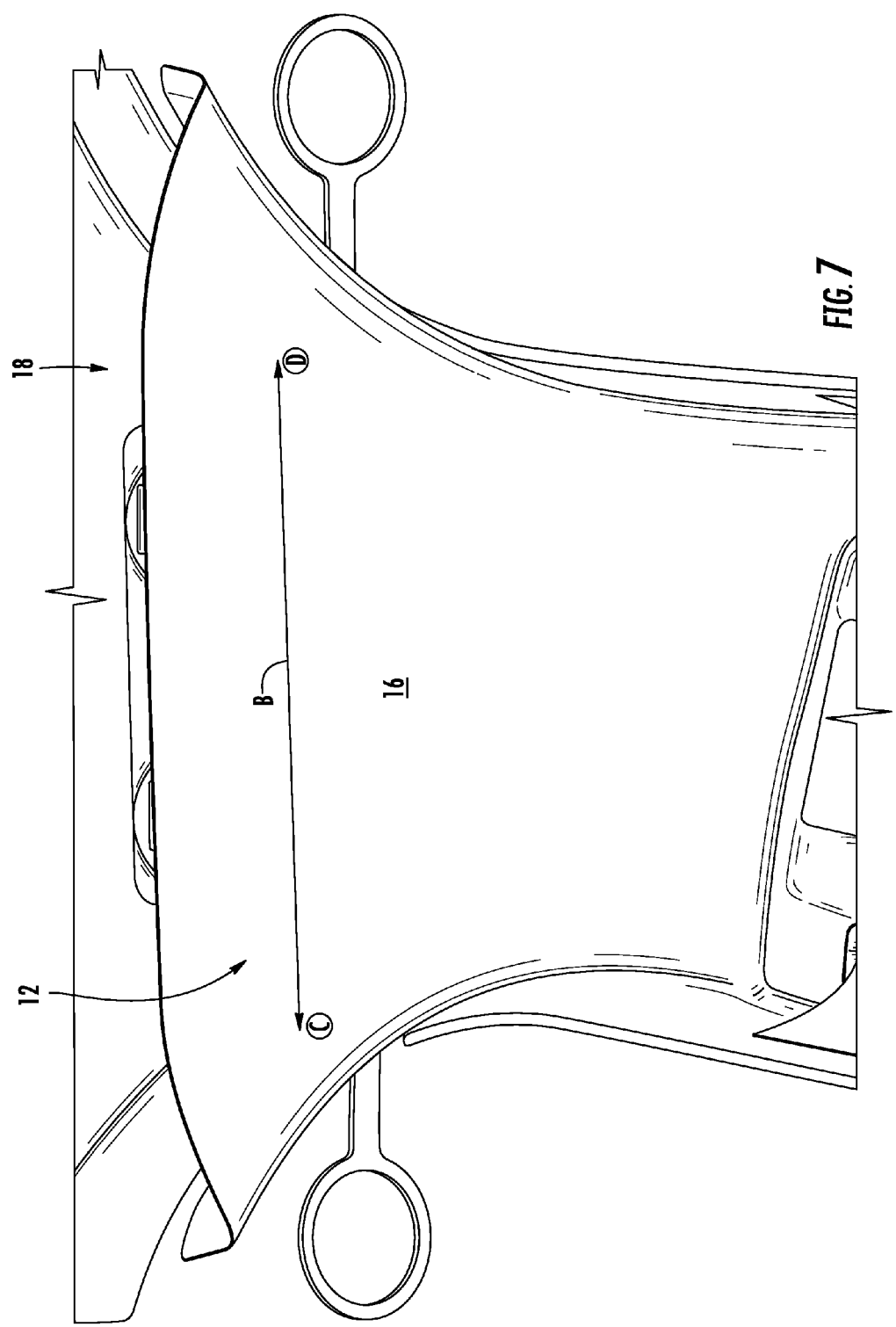
FIG. 7 is a fragmentary perspective view of a trim panel attached to a car body.

As shown in FIG. 1, the clip assemblies 40 are coupled to the bracket portion 20 of trim panel 12. The clip assemblies 40 are now prepared to engage a car body such that the trim panel 12 will be affixed to a car body frame member 18, such as a B-pillar as shown in FIG. 7, with the aesthetic design side 16 of the trim panel 12 facing outwardly into the vehicle interior. As shown in FIGS. 1-3, the clip assemblies 40 are coupled to the bracket portion 20 of the trim panel 12 by first inserting the engagement portion 44 of the clip assemblies 40 into the enlarged end 36 of the slotted brackets 34. The clip assemblies 40, are then moved into the narrowed end 38 of the slots 34 such that channel 45 (FIGS. 2 and 9) is engaged with the slots 34 of slotted brackets 30, 32 of the bracket portion 20 of the trim panel 12. As shown in FIGS. 2 and 9, the channel 45 is defined by the spacing between engagement portion 44 and planar portion 48 of the bracket member 42. When fully inserted into the "key hole" or "dog house" slot 34, the bracket member 42 rigidly retains the clip assembly 40 in the trim panel 12. As shown in the embodiments described herein, the trim panel 12 has one or more slotted brackets 30, 32 disposed on the bracket portion 20 of the trim panel 12. The planar portion 22 of the bracket portion 20 is spaced apart from the body side 14 of the trim panel 12, wherein the spacing generally correlates to the height of the channel 45 disposed on the bracket member 42, thereby ensuring a snug or close engagement of the bracket member 42 with the slotted brackets 30, 32. The snug engagement ensures that the clip assembly 40 will not allow for play in the trim panel 12 as attached to the car body 18. The trim panel 12 can be engaged with the car body 18 using one or more clip assemblies 40, however, it is contemplated that any number of clip assemblies can be used to retain the trim panel on a car body as each specific location demands. In the arrangement shown in FIG. 1, the trim panel 12 is coupled to two clip assemblies 40 and is ready to be coupled to a car body frame member 18 as shown in FIG. 7.

Further, it is contemplated that the clip assemblies 40 can be first inserted into the car body frame member 18 as shown in FIG. 9 and then later coupled to trim panel 12. With the clip assemblies 40 rigidly engaged with the car body 18, the bracket members 42 are exposed such that channels 45 are accessible for engagement with the "keyhole" slots 34 of slotted brackets 30, 32 of the trim panel 12. In this way, the clip assemblies 40 can be first coupled to the car body 18 with the trim panel 12 coupled to the bracket members 42 of the clip assemblies 40 thereafter. In this way, the trim panel 12 is able to couple to the bracket members 42 by moving the trim panel 12 in a car forward direction after bracket members 42 have been inserted into the enlarged ends 36 of the bracket portion 20 of the trim panel 12, thereby moving the bracket members 42 to the narrowed end 38 of slotted brackets 30, 32.

Figure 5:
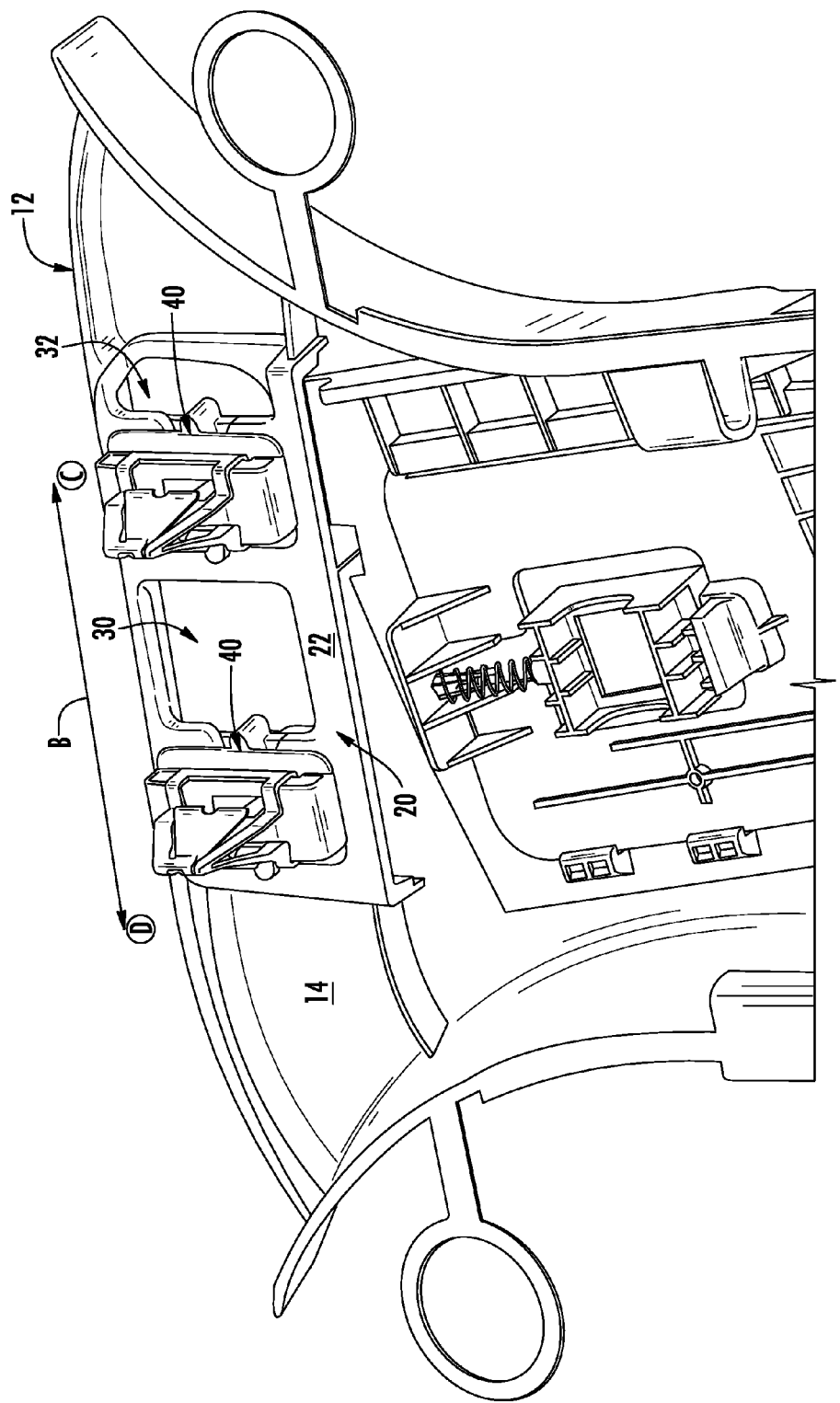
FIG. 5 is a fragmentary perspective view of the trim panel of FIG. 4 having a second clip assembly attached at the bracket portion disposed on a body side of the trim panel.
Figure 6:
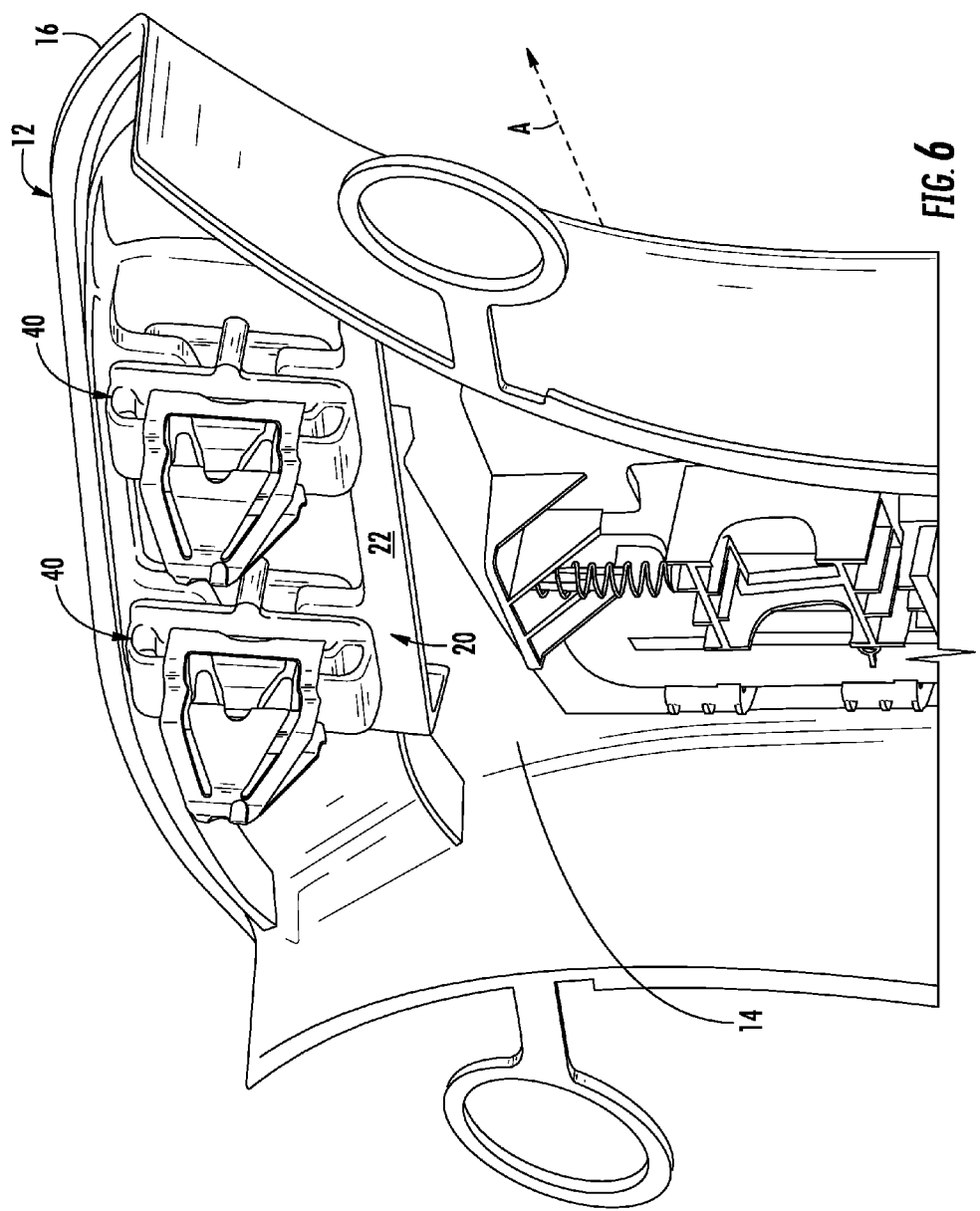
FIG. 6 is a fragmentary perspective view of the trim panel of FIG. 5.

The clip assemblies 40 are coupled to a car body by inserting the clip member 60 (FIG. 8) into an oblong aperture, such as aperture 84, disposed on a car body 18. When inserting the clip members 60 into apertures 84, the upper portions 69, 67 are first inserted and engagement members 72, 74 are deformed and flexed at pivot portions 76 (FIG. 2) such that the engagement portions 72, 74 are displaced towards one another to allow full insertion of the clip members 60 into apertures 84. As the clip member 60 is further inserted into the aperture 84, the abutment portions 78 pass through the aperture thereby allowing the engagement members 72, 74 to resiliently snap into place such that the outer rim of the aperture 84 is disposed between the abutment portions 78 and engagement tabs 82 of the clip members 60. The clip assemblies 40 are designed to provide rigid retainment or high retention of the trim panel 12, wherein the trim panel 12 is disposed over an air curtain deployment system. As used herein, the term air curtain deployment system generally refers to an air deployment mechanism, wherein an air bag or air curtain is deployed into a vehicle interior after being triggered by an event such as a collision event. The air curtain deployment mechanism can also be deployed due to a static deployment wherein no collision occurs. In a dynamic deployment, the air curtain deployment mechanism is deployed during a collision event and the car body 18 can be deformed thereby affecting the robustness of a trim attachment system. The present trim attachment system 10 allows for high retention of the trim panel 12 to the car body 18 while the force of an air curtain deployment mechanism is realized on the trim panel 12, even if deformation of the car body 18 or B-pillar occurs. It is contemplated that the trim panel 12 further comprises a piercable portion, wherein the piercable portion is configured to be adjacent to an air curtain deployment mechanism in assembly. In this way, an air curtain, as deployed from an air curtain deployment mechanism, can pierce through the piercable portion of the trim panel 12 to fully deploy within a vehicle interior to protect the vehicle occupants while the trim panel 12 is rigidly retained on the car body 18 by the trim panel attachment system 10. Thus, the trim panel 12 is rigidly retained on the car body 18 even during deployment of an adjacent air curtain deployment mechanism. Further, the trim panel 12 is easily removed in order to allow access to the air curtain deployment mechanism if service is required. Thus, the trim attachment system 10 of the present invention rigidly retains the trim panel 12 on the car body 18 when an air curtain force is acted on the trim panel 12 in an outward direction indicated by arrow A in FIG. 6, which represents a force acting on the trim panel towards the vehicle interior. While the present invention allows for rigid retainment of the trim panel 12 on a car body 18 under a force A, the trim panel 12 is also easily removed from the clip assemblies 40 using a fore and aft movement indicated by arrow B, as shown in FIGS. 5 and 7, such that the trim panel 12 moves between an engaged position C (car-forward) and a release position D (car-rearward). As used throughout this disclosure, the term "high retention" describes the ability of the present attachment system to retain a trim panel on a car body while a force, such as an air curtain deployment, is acted on a body side of the trim panel in a direction as indicated by arrow A. The high retention capabilities of the trim panel attachment system include retention of the trim panel on a car body when a force of 300 pounds or more is realized on the trim panel 12 during an air curtain deployment.

In the past, trim panels used to cover or conceal air deployment mechanisms have had to employ bolts or fasteners to rigidly retain the trim panel to the car body 18. The fasteners had to be accessible through the aesthetic design side of the trim panel and were generally covered by plugs or other like fastener covers. The trim attachment system of the present invention allows for straight loading of the trim panel 12 to the car body 18 for rigid retainment during an air curtain deployment without the need for bolts or other like fasteners that must be accessed through the design side of the trim panel thereby affecting the overall appearance of the design side of the trim panel. As shown in FIG. 7, the design side 16 of the trim panel 12 has no visible buttons, plugs or fasteners when rigidly coupled to the car body 18.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, and those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

It is also to be understood that variations and modifications can be made on the aforementioned structure without departing from the concepts of the present invention, and further it is to be understood that such concepts are intended to be covered by the following claims unless the claims, by their language, expressly state otherwise.

We claim:

1. A trim attachment system comprising:
    a trim panel adapted to cover an air curtain deployment mechanism, the trim panel having at least one slotted bracket;
    a bracket member including a clip receiving portion, wherein the bracket member is releasably coupled to the at least one slotted bracket;
    a clip member received in the clip receiving portion and adapted to couple to a car body, wherein the clip member is a high retention clip member adapted to retain the trim panel on the car body during deployment of the air curtain deployment mechanism, and further wherein the trim panel can be removed from the bracket member to provide access to the air curtain deployment mechanism.

2. The trim attachment system as set forth in claim 1, wherein:
    the trim panel includes a body side and a design side, the body side having the at least one slotted bracket disposed thereon.

3. The trim attachment system as set forth in claim 1, wherein:
    the at least one slotted bracket includes a slot having a first enlarged end and a narrowed second end.

4. The trim attachment system as set forth in claim 3, wherein:
    the slot is a keyhole slot.

5. The trim attachment system as set forth in claim 3, wherein:
    the bracket member includes an engagement portion adapted to be received in the first enlarged end of the slot and slideably received in the narrowed second end of the slot to releasably couple the bracket member to the slot of the at least one slotted bracket.

6. The trim attachment system as set forth in claim 5, wherein:
    the clip receiving portion of the bracket member includes a planar portion coupled to the engagement portion by a web portion to define a channel.

7. The trim attachment system as set forth in claim 6, wherein:
    the trim panel is removed from the bracket member by sliding the trim panel in a car-rearward direction to align the engagement portion of the bracket member with the enlarged first end of the slot of the slotted bracket.

8. The trim attachment system as set forth in claim 7, wherein:

the clip is a high retention clip capable of retaining the trim panel on the car body when a force of 300 pounds is realized on the trim panel by the air curtain deployment mechanism.

9. A trim attachment system comprising:
a clip member coupled to a car body;
a bracket member coupled to the clip member at a clip receiving portion, wherein the bracket member further includes an engagement portion; and
a trim panel having a bracket portion adapted to couple to the engagement portion, wherein the trim panel is releasable from the engagement portion while the clip member is coupled to the car body.

10. The trim attachment system as set forth in claim 9, wherein: the bracket portion includes at least one slot having a first enlarged end and a narrowed second end to define a keyhole slot.

11. The trim attachment system as set forth in claim 10, wherein:
the engagement portion is adapted to be received in the first enlarged end of the slot and slideably received in the narrowed second end of the slot to releasably couple the bracket member to the at least one slot of the bracket portion.

12. The trim attachment system as set forth in claim 11, wherein:
the trim panel is removed from the bracket member by sliding the trim panel in a car-rearward direction to align the engagement portion of the bracket member with the enlarged first end of the at least one slot of the bracket portion.

13. The trim attachment system as set forth in claim 12, wherein:
the clip member is a high retention clip member adapted to retain the trim panel on the car body during deployment of an air curtain deployment mechanism.

14. The trim attachment system as set forth in claim 13, wherein:
the clip receiving portion is coupled to the engagement portion by a web to define a channel adapted to be received in the slot of the slotted bracket.

15. A trim attachment system comprising:
a trim panel having a bracket portion;
a bracket member releasably coupled to the bracket portion having a clip receiving assembly; and
a clip member received in the clip receiving assembly and adapted to couple to a car body, wherein the clip is a high retention clip adapted to retain the trim panel on the car body during an air curtain deployment event.

16. The trim attachment system as set forth in claim 15, wherein:
the trim panel includes a body side and a design side, wherein the bracket portion is disposed on the body side and further includes at least one slot.

17. The trim attachment system as set forth in claim 16, wherein:
the at least one slot includes a first enlarged end and a narrowed second end to define a keyhole slot.

18. The trim attachment system as set forth in claim 16, including:
an engagement portion disposed on the bracket member and adapted to be received in the first enlarged end of the slot and slideably received in the narrowed second end of the slot to releasably couple the trim panel to the bracket member.

19. The trim attachment system as set forth in claim 18, wherein:
the trim panel is removed from the bracket member by sliding the trim panel in a car-rearward direction to align the engagement portion of the bracket member with the enlarged first end of the slot of the slotted bracket to provide access to an air curtain deployment mechanism.

* * * * *